INVENTOR.
WILLIAM J. PARKER
CLAY P. BUTLER
GAYNOR L. ABBOTT
ROBERT J. JENKINS
BY
ATTORNEYS

INVENTORS
WILLIAM J. PARKER
CLAY P. BUTLER
GAYNOR L. ABBOTT
ROBERT J. JENKINS
BY
ATTORNEYS

Jan. 19, 1965   W. J. PARKER ETAL   3,165,915
DETERMINATION OF THERMAL PROPERTIES OF MATERIALS
Filed July 25, 1961   3 Sheets-Sheet 3

INVENTORS
WILLIAM J. PARKER
CLAY P. BUTLER
GAYNOR L. ABBOTT
ROBERT J. JENKINS
BY
(AGENT)
ATTORNEYS

3,165,915
DETERMINATION OF THERMAL PROPERTIES OF MATERIALS

William J. Parker, 246 Hillside Drive, Pacifica, Calif.;
Clay P. Butler, 738 Sequoia, San Mateo, Calif.; Gaynor
L. Abbott, 1345 Taylor St., San Francisco, Calif.; and
Robert J. Jenkins, 501 Midvale Way, Mill Valley, Calif.
Filed July 25, 1961, Ser. No. 128,626
16 Claims. (Cl. 73—15)
(Granted under Title 35, U.S. Code (1952), sec. 266)

The invention described herein may be manufactured and used by or for the Government of the United States of America for governmental purposes without the payment of any royalties thereon or therefor.

The present invention relates to the determination of thermal properties of materials and, more particularly, to a method and apparatus for determining the thermal diffusivity, heat capacity and thermal conductivity of such materials.

The recent rapid advances made in the area of materials technology and the many new applications of materials at temperature extremes, especially at elevated temperatures, have created need for an improved method for determining the thermal properties of a great variety of materials which can accomplish the task with ease, speed and reliability. There is a general dissatisfaction with the various methods (both steady state and non-steady state methods) heretofore employed to measure the above-specified thermal properties: some require an excessive period of time to produce reliable measurements; some require elaborate equipment; some must be carried out in a vacuum; some require that both front and back surfaces of the specimen material be enclosed; and still others require a size of specimen material which is prohibitive. A significant deficiency of the prior art has been the difficulty of extending these previous methods to the handling of material specimens at high temperatures; this difficulty has proven to be a stumbling block in high temperature technology.

In the present invention a "flash" method is used for measuring the thermal diffusivity, heat capacity and thermal conductivity of materials. A thermally-insulated material specimen, relatively small in thickness (a few millimeters is illustrative) and having "front" and "rear" surfaces is uniformly irradiated by a high-intensity, short-duration light (thermal) pulse. The specimen is so supported that only the front surface of the specimen is subjected to the radiation, the back surface and the side edges being shielded therefrom. The radiation absorbed by this front surface of the material specimen establishes a temperature gradient between the front and rear surfaces of the specimen which gives rise to an unsteady/transient heat flow through the specimen from front to rear surfaces until steady state equilibrium condition is established within the material specimen, at which time the front and rear surfaces thereof have equalized in temperature. A thermocouple in contact with the rear surface of the specimen and electrically connected to an oscilloscope-with-camera combination transposes the temperature of the rear surface of the material specimen to an electrical signal with is indicated on the oscilloscope and permanently recorded on film by the camera, associated therewith, to portray a temperature-versus-time history of the rear surface of the specimen. From this temperature-versus-time history the derivation of the sought-for thermal properties is determinable by virtue of the nature of the process with its ability to satisfy adopted "boundary conditions." Thermal diffusivity of the given material specimen is reflected in the shape of the temperature-versus-time curve portraying the temperature history at the specimen's rear surface, heat capacity by the maximum temperature indicated by the thermocouple and thermal conductivity by the product of the heat capacity, thermal diffusivity and the density of the material constituting the specimen.

In an engineering analysis of thermodynamic processes feasibility of accurately determining such physical properties as are sought herein requires the ability to meet or closely approximate certain predetermined boundary conditions for the "heat flow equation." The inability to satisfy such boundary conditions has led to difficulties with various previous techniques employed. Significant obstacles are surface heat losses and thermal contact resistance between the specimen and its associated heat sources and sinks. These difficulties have been thwarted successfully by the method and apparatus herein employed: the problem of thermal contact resistance is virtually eliminated by thermal insulation of the material specimen and the "flash" radiation method of introducing heat to the specimen; the surface heat losses are minimized by the process herein where the required measurements are made in a very short time so that very little cooling can take place during the process.

Another significant advantage of the method and apparatus employed herein is that they introduce a capacity to measure the afore-described properties for all types of solid materials in any temperature range; this is accomplished by the facile step of preheating or cooling the given specimen, prior to irradiation, to the desired initial temperature.

In contradistinction to aforementioned inadequacies of former methods and apparatus akin hereto, the method and apparatus hereof are simple, do not require elaborate equipment, accomplish the desired measurements in a very short time, do not involve the need of vacuum, do not necessitate enclosing the front and back surfaces of the specimen, require only a small specimen size, can measure the sought thermal characteristics over the full range of values (as opposed to over a limited range, only) and portray an easily-portable unit. A significantly attractive feature of the present invention is that the amount of energy added to the material specimen for effectuating the determination of its thermal properties is quite low; this is especially advantageous as it relates to low temperature measurements.

An object of the present invention is to determine thermal characteristics of materials.

A further object is to determine any or all of such thermal properties of materials as thermal diffusivity, heat capacity and thermal conductivity.

Another object is to determine any or all of such thermal properties of solid materials as thermal diffusivity, heat capacity and thermal conductivity over a wide temperature range of said materials.

Still another object is to determine any or all of such thermal properties of solid materials as thermal diffusivity, heat capacity at high and/or at low temperatures.

An additional object is to determine such thermal properties as thermal diffusivity, heat capacity and thermal conductivity for a wide variety of solid materials.

A derivative object is to establish means for identifying the make-up of materials by determination of their thermal diffusivity, heat capacity and thermal conductivity characteristics.

Other objects and many of the attendant advantages of this invention readily will be appreciated as the same becomes better understood by reference to the following detailed description when considered in conjunction with the accompanying drawing in which.

Figure 1:
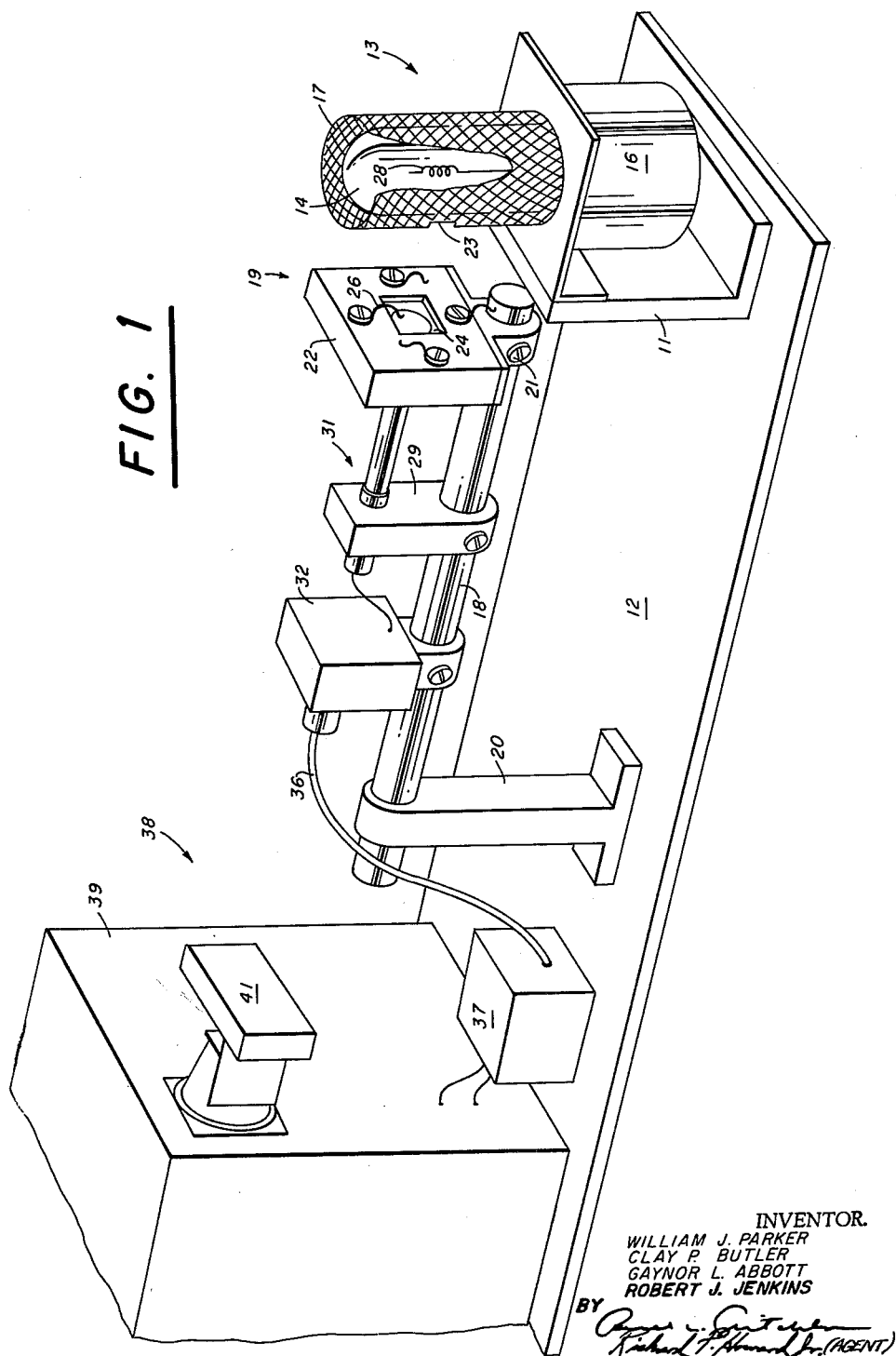
FIG. 1 is a pictorial schematic of the apparatus of the invention.
Figure 2:
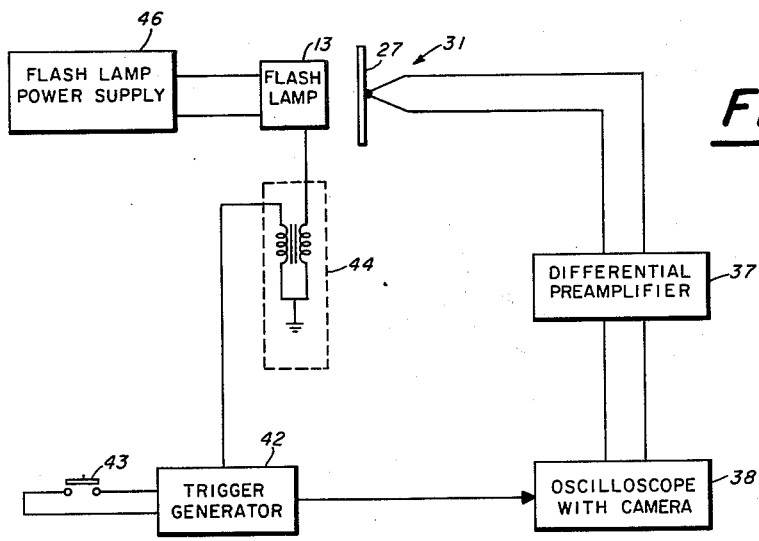
FIG. 2 is a schematic emphasizing the electrical structure of the apparatus.
Figure 3:
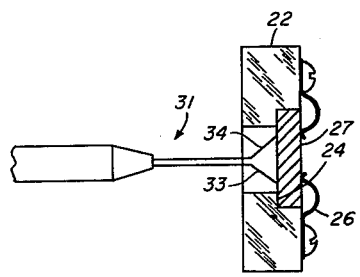
FIG. 3 shows a portion of the specimen holder with the material specimen supported therein.

Referring now in detail to an illustrative embodiment of the invention apparatus as portrayed in FIGS. 1–3, mounted on vertically-extending standard 11 which extends from a solid base 12 is a flash lamp unit 13 having a flash tube 14 and a pedestal 16. Flash tube 14 may be encompassed by an electrical and safety screen 17.

Supported by a standard 20, also mounted on base 12, is a horizontally-disposed rod-like member 18, one of whose ends extends into close proximity to flash lamp unit 13. Adjustably mounted on member 18 for operator-selective horizontal movement along member 18, toward or away from flash lamp unit 13, is a specimen holder 19 which, by means of set screw 21, can be locked into fixed position along member 18 when the specimen holder 19 is at its desired position with respect to flash tube 14.

Specimen holder 19 serves to support specimen 27 in fixed position with respect to flash tube 14 and in thermal insulation while the specimen's front surface (i.e., that surface facing flash tube 14 when the specimen is operatively supported by specimen holder 19 for irradiation) is being irradiated by flash tube 14. The principal portion of specimen holder 19 is an apertured block 22, of ceramic or like material, which is carried by the balance of the specimen holder 19 for adjustable positioning along member 18. Ceramic block 22 is stepped to form a vertically-extending recessed seat 24 which serves as a supporting back stop for the material specimen. This specimen holder block 22 must be opaque to prevent any irradiation of the rear surface of the specimen, of low thermal conductivity to reduce edge losses, physically strong, and capable of withstanding the high irradiant thermal pulse to which it is subjected. An illustrative block was machined from lava and baked at 1100° C. to produce a hard ceramic material of considerable strength. When in operative position in the specimen holder block 22, the material specimen 27 is so positioned that its front surface is parallel to the axis of the quartz spiral 28 of flash tube 14 and in close proximity to the envelope of the flash tube. As previously noted, when specimen 27 is in operative, supported position in block 22, only its front surface is exposed to the irradiation; the side edges and the back surface of specimen 27 are shielded from the irradiation by block 22.

Rotatably mounted on the outboard portion of that face of block 22 which faces flash tube 14 are a plurality of small spring wire retainers 26 which can be rotated into specimen securing position as seen at the upper-positioned retainer in FIG. 1 and into specimen-releasing position as seen at the lower positioned retainer in the same figure. FIG. 1 shows block 22 without the material specimen supported therein and FIG. 3 shows block 22 with the material specimen 27 operatively supported thereby in its to-be-irradiated position. Spring wire retainers 26, when in operative specimen-supporting position, obscure very little of the front surface of the specimen during irradiation thereof, so that their effect upon the irradiation of the specimen is of no significance to the process involved.

Also positioned on member 18, at a position to the rear of specimen holder 19 and with its "measuring" or "hot" junction slidably supported on member 18 by means of supporting member 29 which is selectively slidable along rod-like member 18 so that the "hot" junction end may be positioned to contact the rear surface of an operatively-supported material specimen, is a thermocouple 31. This thermocouple 31 is conventional and, in addition to the aforementioned "hot" or "measuring" junction, also includes a "cold" or "reference" junction 32 which in this illustrative embodiment is a combination electrical-plug-and-cold-junction. When the material specimen is an electrical conductor it has been found that the best species of a "hot" junction is one where the two wires of the thermocouple are pointed and are kept separated. Contact is made with the specimen by holding both prongs in intimate contact with the rear surface of the specimen and slightly spaced from one another. This type of "hot" junction uses the rear surface of the specimen as part of the thermoelectric circuit and, where applicable, is advantageous because it ensures that the temperature recorded by thermocouple 31 is actually that at the back surface and not at some other wire junction. Where the specimen is a nonconducting material, the more conventional bead-type terminus must be employed at this hot/measuring junction. In this illustrative embodiment a 0.12 mm. diameter chromel-alumel wired thermocouple was used and the prongs 33 and 34 of the "hot" junction end were separated by some 1–2 mm. where they contacted the rear surface of the specimen.

From the combination cold-junction-and-plug 32 electrical leads 36 pass to a differential preamplifier 37. Differential preamplifier 37 amplifies the signal generated by the thermocouple 31 in response to the temperature variation of the rear surface of material specimen 27 and passes this signal to a combination oscilloscope-and-camera unit 38, the oscilloscope portion 39 of the unit depicting, in response to the amplified signal from thermocouple 32, a temperature-versus-time curve and the camera portion 41 of the unit permanently recording this temperature-versus-time response to establish a temperature-versus-time history for the rear surface of the given material specimen under investigation.

Differential preamplifier 37 is a temperature-stabilized amplifier (i.e., its gain is stabilized against temperature shifts) whose required characteristics are that it be quiet, stable and linear under the required conditions of operation. Such units now commercially available will suffice. The temperature readings last only for a matter of microseconds of the order portrayed by the flash tube irradiance history as seen in FIG. 4 during a given specimen investigation.

As seen in FIG. 2, trigger generator 42, actuated by an operator-operable on-off switch 43, has a twofold output, one leading to the oscilloscope-camera unit 38 and the other passing, via a trigger transformer 44, to flash lamp unit 13 which is also connected to a flash lamp power supply 46. The triggering signal received by flash lamp unit 13 causes ionization within the flashtube, thereby causing the flashtube resistance to drop markedly with resultant "flashing" of the tube by virtue of the small resistance now offered to the potential established by power supply 46.

Figure 6:
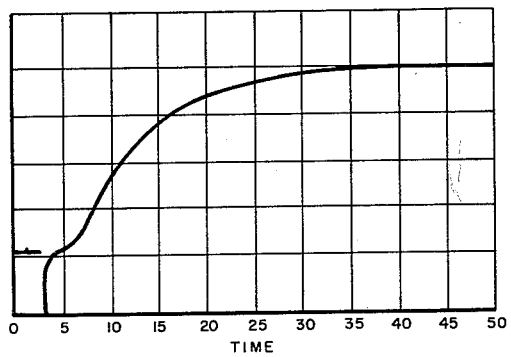
FIG. 6 represents a photographic trace depicting the rear surface temperature history for a nickel specimen.

There is an inherent time differential between the initiation of the time baseline on oscilloscope 39 and the first registering thereon of the operative temperature-reflecting ordinate values, due to the transient time between the initiating triggering signal from trigger generator 42 and the responsive, sequential temperature registration on the oscilloscope. It has proved convenient for reading the values of the curve recorded by camera 41 to have a length of baseline prior to the registering of operative temperature values. Accordingly, a time delay feature is incorporated in trigger generator 42 to fire the flash lamp after the oscilloscope has been triggered. In FIG. 6, which represents a photographic trace depicting the rear surface temperature history (obtained by the method hereof) for a nickel specimen, the aggregate of this selected time delay and trigger transient time are visible to the left of the trace. In the illustrative embodiment time delays have been utilized ranging from 0.3 to 4700 milliseconds.

Figure 4:
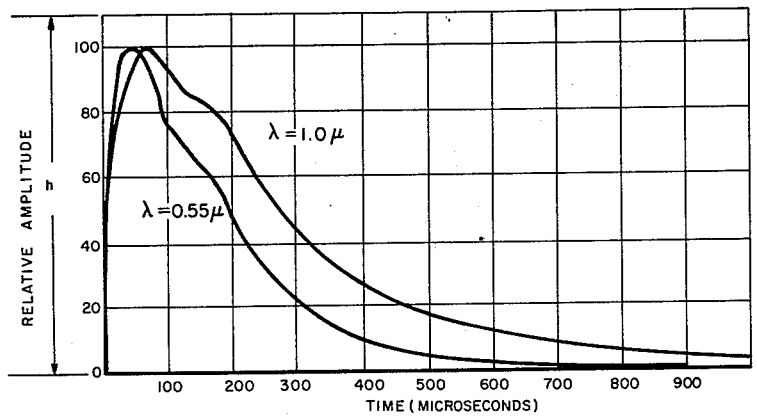
FIG. 4 is an irradiance history for an illustrative flash tube.

FIG. 4 portrays, for two different wavelengths, an irradiance-versus-time curve for a suitable flash tube which, in this instance, consisted of a four turn quartz spiral with a Pyrex envelope and which dissipated 400 joules of energy in each flash. When flash tube 14 is surrounded by screen 17, the screen will have a window 23 cut therein which will look out directly at the material specimen when it is in operative position in block 22 for irradiation and which will be somewhat oversized with respect to the outer boundary of the specimen it faces.

Figure 5:
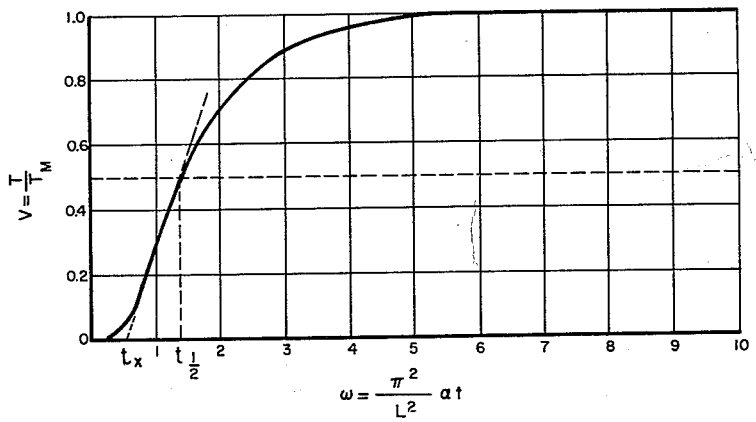
FIG. 5 is an idealized dimensionless plot of the rear surface temperature history of a material specimen.

FIG. 5 is an "ideal" dimensionless plot of the rear surface temperature history of a material specimen.

OPERATION

The specimen to be examined is inserted into the recessed portion of perforated block 22 and wire retainers 26 are pivoted into securing position to hold the specimen 27 in place in the block. Prior to irradiation of the specimen 27, it often is an advantageous practice, though not a necessary one, to blacken the front surface of the specimen with camphor black, or the like, thus giving the specimen a "black-body" front surface; this increases the amount of energy absorbed by the specimen, insures that all parts of the specimen have equal absorption and that the absorptivities of all material specimens are identical. This step represents an additional advantageous increment, but is not essential to the efficacy of the method for it is a simple procedure to obtain uniform irradiation on a flat surface from a flash lamp and blackening is inapplicable when the specimen is at high temperatures.

The material specimen after being operatively mounted in block 22 is brought into close proximity to flash tube 14; an illustrative distance range for this operative spacing between the envelope of flash tube 14 and the front surface of the specimen is in the order of 1–10 centimeters; this distance of course depends on the flash lamp geometry and the power output thereof. With specimen 27 and flash tube 14 operatively spaced the "hot junction" of thermocouple 31 is brought into intimate contact with the rear surface of specimen 27 via the aperture in block 22.

With the specimen, thermocouple, and flash tube all in operative position, trigger generator 42 is actuated by the operator-closing of switch 43 to give rise to trigger signals which respectively "trigger" flash tube 14 and oscilloscope 39. In response to the resulting irradiation of the front surface of the specimen by flash tube 14, which emits a high-intensity, short-duration light (i.e., thermal) pulse, the temperature of the specimen's rear surface begins to change as "heat" flows from front to rear of the specimen. This temperature shift of the rear surface of the specimen is detected by thermocouple 31 and transposed thereby into an electrical signal which is amplified at preamplifier 37 and transmitted therefrom to oscilloscope 39 to form thereon a temperature-versus-time curve which is photographed by camera 41 to give a permanent temperature-time history of the rear surface of the given specimen. This temperature-time curve will level off as temperature equilibrium is reestablished throughout the specimen, bringing the temperature gradient between front and rear surfaces of the specimen to zero. The opaqueness of block 22 prevents any distorting irradiation of the rear surface of the specimen; this same opaqueness of block 22 precludes irradiation of the side edges of the specimen so that it is only the front surface of the specimen which is irradiated. The low thermal conductivity of block 22 keeps the specimen thermally insulated to minimize edge losses.

With regard to a suitable size for the material specimen, the minimum thickness of the specimen is controlled by the requirement that the flash duration must be short compared to the time the temperature begins to rise at the specimen's rear surface i.e., short compared with the time required for heat to flow through the specimen from its front to rear surfaces. This requirement that the front surface of the specimen be uniformly irradiated with a pulse of thermal energy in a time which is short compared to the rise time of the back surface temperature (of the specimen) must be met. Too thin a specimen will result in the recording of a low value of diffusivity. On the other hand, if the sample is too thick the sensitivity is reduced and the time for losses to occur is increased. Using the flash lamp previously described, a satisfactory thickness is about 1 mm. for specimens of diffusivity less than 0.2 cm.$^2$/sec. and about 3 mm. for samples of higher diffusivity. A typical exemplary flash tube is commercially-available G.E. Type 524 which discharges 600 joules. Using such a flash tube the thermal pulse will be completed in about 500 microseconds while the time required for the rear surface of a representative specimen to reach one half of its maximum temperature rise will be something on the order of 50 to 300 milliseconds.

The prior description has been directed to specimens initially in the vicinity of ambient room temperature. The process can be applied to specimens at elevated or lowered initial temperatures simply by preheating or cooling the specimens to the desired temperature level prior to irradiation.

*Theory of the method and thermal characteristics' determination derivative therefrom*

[Key list of symbols employed]

T—Temperature in degrees centigrade above ambient
Q—Energy absorbed per square centimeter
C—Heat capacity
K—Thermal conductivity
D—Density
L—Thickness of specimen
$T_M$—Maximum temperature rise at the rear surface of the specimen
$T_f$—Maximum temperature rise at the front surface of the specimen
$t_{1/2}$—Time required to reach ½ $T_M$
$t_x$—Time axis intercept of the constant slope position of the temperature rise curve
$\alpha$—Thermal diffusivity
$\alpha_{1/2}$—Thermal diffusivity calculated from $t_{1/2}$
$\alpha_x$—Thermal diffusivity calculated from $t_x$
$\exp(x) = e^x$, $e$ being the well-known base of natural logarithms and $x$ being used to designate a variable. Here "$\exp(x)$" is used simply as a convenient typewritten substitute for the term "$e^x$."
$n$—Represents successive integers and takes successively the values 1, 2, 3.

If the initial temperature distribution within a thermally insulated solid of uniform thickness, L, is T($x$,0), the temperature distribution at any later time is given as $$T(x,t) = \frac{1}{L}\int_0^L T(x,0)\,dx + \frac{2}{L}\sum_{n=1}^{\infty} \exp\left(\frac{-n^2\pi^2\alpha t}{L^2}\right) \cos\frac{n\pi x}{L} \int_0^L T(x,0)\cos\frac{n\pi x}{L}\,dx \quad (1)$$

If a pulse of radiant energy, Q, is instantaneously and uniformly absorbed in the small depth, $g$, at the front surface, $x=0$, of a thermally insulated solid of uniform thickness, L, the temperature distribution at that instant is given by $$T(x,0) = \frac{Q}{DCg} \text{ for } 0 < x < g \text{ and } T(x,0) = 0 \text{ for } g < x < L$$

With this initial condition, Equation 1 can be written as $$T(x,t) = \frac{Q}{DCL}\left[1 + 2\sum_{n=1}^{\infty} \cos\frac{n\pi x}{L} \frac{\sin(n\pi g/L)}{(n\pi g/L)} \exp\left(\frac{-n^2\pi^2}{L^2}\alpha t\right)\right] \quad (2)$$

In this application only a few terms will be needed, and since $g$ is a very small number for opaque materials, it follows that $\sin n\pi g/L \approx n\pi g/L$. At the rear surface where $x=L$, the temperature history can be expressed by $$T(L,t)\frac{Q}{DCL}\left[1+2\sum_{n=1}^{\infty}(-1)^n \exp\left(\frac{-n^2\pi^2}{L^2}\alpha t\right)\right] \quad (3)$$

Two dimensionless parameters, $V$ and $\omega$, can be defined, $$V(L,t) = T(L,t)/T_M \quad (4)$$

$$\omega = \pi^2\alpha t/L^2 \quad (5)$$

$T_M$ represents the maximum temperature at the rear surface. The combination of 3, 4, and 5 yields $$V = 1 + 2\sum_{I=n}^{\infty}(-1)^n \exp(-n^2\omega) \quad (6)$$

Equation 6 is plotted in FIG. 5.

Two ways of determining $\alpha$ have been deduced from Equation 6 and FIG. 5. When $V$ is equal to 0.5, $\omega$ is equal to 1.38 and so $$\alpha_{1/2} = \frac{1.38 L^2}{\pi^2 t_{1/2}} \quad (7)$$

where $t_{1/2}$ is the time required for the back surface to reach half of the maximum temperature rise.

The time axis intercept of the extrapolated straight line portion of the curve in FIG. 5 is at $\omega = 0.48$ which yields another useful relationship, $$\alpha_x = \frac{0.48 L^2}{\pi^2 t_x} \quad (8)$$

where $t_x$ is the time axis intercept of the temperature versus time curve.

It is not necessary to know the amount of energy absorbed in the front surface in order to determine the the thermal diffusivity. However, this quantity must be determined if measurements of specific heat or thermal conductivity are required. The product of the density and the heat capacity of the material is given by $$DC = Q/LT_M \quad (9)$$

and the thermal conductivity is found from the relationship.

$$K = \alpha_a DC \quad (10)$$

As previously explained, the thermal diffusivity of the given material specimen is reflected in the shape of the temperature-versus-time curve portraying the temperature history at the specimen's rear surface, heat capacity by the maximum temperature indicated by the thermocouple and thermal conductivity by the product of the heat capacity thermal diffusivity and the density of the material constituting the specimen. On graphical analysis of the temperature-time curve, a comparison of the temperature rise in the specimen with that in a silver sample of similar shape and size will enable a heat capacity measurement for the given specimen. In determining Q, the energy absorbed per square centimeter by the front surface of the specimen, a blackened surface of a silver specimen was utilized as a basis of comparison and working backwards from assumed knowledge of the heat capacity for the silver specimen, the Q of a "standard" silver specimen was determined. The Q of silver can be determined very accurately and serves as the basis for calibrated determination of the Q of any given specimens.

There is a way of enuring that the test results are accurate, i.e., that no significant error has crept into the process. The shape of the actual temperature-versus-time curve produced by a given specimen (e.g., as shown in FIG. 6 for a nickel specimen), if compared with the idealized curve shown in FIG. 5, will reflect any appreciable deviations from the ideal boundary conditions of the irradiation-measurement process. If the final temperature is approached very slowly after an initially fast rise, or if the curve actually has a peak before seeking a lower temperature plateau, this is indication that there was a non-uniform distribution of irradiance on the front surface of the specimen. The later effect will appear if the supporting structure should mask an appreciable portion of the to-be-irradiated surface. The distortion in the curve is due to two-dimensional heat flow which is slow because of the greater distances and usually has a small effect on the early part of the curve.

All temperatures are related to the reference datum of the initial temperature of the specimen before irradiation thereof. This initial temperature can be ambient room temperature, or temperature at higher or lower level, if the specimen is preheated or cooled prior to irradiation. The reference datum shown in the prior description was ambient room temperature.

Obviously many modifications and variations of the present invention are possible in the light of the above teaching. It is intended to cover all changes and modifications of the embodiment set forth herein which do not depart from the spirit and scope of the invention.

What is claimed is:

1. A method for determining the thermal properties of thermal diffusivity, heat capacity and thermal conductivity of materials comprising performance of the following steps on a given material specimen having front and rear surfaces and side edges: irradiating the front surface of said specimen with a high-intensity, short-duration light pulse while at the same time substantially maintaining the rear surface and side edges of said specimen in thermal insulation and shielded from said irradiating light pulse, the irradiation absorbed by the front surface of said specimen in response to said light pulse giving rise to a temperature gradient between the front and rear surface of said specimen; detecting the temperature of the rear surface of said specimen throughout the period of transient heat flow initiated by said pulse-established temperature gradient until steady state equilibrium condition is reestablished in said specimen; and recording on a time basis the varying temperature of the rear surface of said specimen during said period of transient heat flow to produce a temperature-versus-time history of the rear surface of said specimen during said transient heat flow period; thermal diffusivity being determinable from the curve depicting said temperature-versus-time history of the rear surface of said specimen by virtue of the equation $$\alpha = \frac{1.38 L^2}{\pi^2 t_{1/2}}$$

wherein $\alpha$ is the thermal diffusivity in square centimeters per second, L is the thickness of the specimen, measured from front to rear surfaces, in centimeters, $\pi$ is 3.14 and $t_{1/2}$ is the time in seconds for the rear surface of said specimen to reach one-half its maximum temperature rise above ambient temperature as reflected in said temperature-time curve; heat capacity being determinable from said curve depicting said temperature-versus-time history of the rear surface of said specimen by virtue of the equation $C = Q/LT_M D$ wherein C is the heat capacity in degrees per calorie per gram for said specimen, Q is the heat energy in calories per square centimeter absorbed per square centimeter by the front surface of said specimen during the irradiation thereof, L is the thickness between front and rear surface of said specimen in centimeters, $T_M$ is the maximum temperature above ambient temperature in degrees centigrade at the rear surface of said specimen as reflected in said temperature-time curve and D is the density of the material of said specimen in grams per cubic centimeter; thermal conductivity being determinable from said curve depicting said temperature-versus-time history of the rear surface of said specimen by virtue of the equation $K = \alpha DC$ wherein K is the thermal conductivity in calories per centimeter per second per degree centigrade, $\alpha$ is the thermal diffusivity in square centimeters per second, D is the density of the material of said specimen in grams per cubic centimeter and C is the heat capacity of said specimen in degrees per calorie per gram.

2. The method of claim 1 wherein the front surface of said material specimen is blackened prior to irradiation to give it black-body absorptivity thereby increasing the amount of energy absorbed by said specimen during irradiation, ensuring that all parts of the front surface of said specimen have equal absorption and that the absorptivity of the given specimen under instant investigation has an equal capacity for irradiation absorptivity as other specimens being investigated at some other time, so that a very exact basis of comparison between different specimens is attainable.

3. The method of claim 1 wherein the front surface of said specimen is uniformly irradiated throughout.

4. The method of claim 1 wherein a light pulse source dissipating 400 joules of energy per a pulse whose duration is short compared with the time required for heat to flow through said specimen from its front to its rear surface is a representative light source, illustrating the high-intensity, short-duration characteristics of said light pulse.

5. The method of claim 1 wherein the duration of said light pulse is short compared with the time required for heat to flow through said specimen from its front to its rear surface.

6. A method for determining the thermal diffusivity of materials comprising performance of the following steps on a given material specimen having front and rear surfaces and side edges: irradiating the front surface of said specimen with a high-intensity, short-duration light pulse while at the same time substantially maintaining the rear surface and side edges of said specimen in thermal insulation and shielded from said irradiating light pulse, the irradiation absorbed by the front surface of said specimen in response to said light pulse giving rise to a temperature gradient between the front and rear surfaces of said specimen; detecting the temperature of the rear surface of said specimen throughout the period of transient heat flow initiated by said pulse-established temperature gradient until steady state equilibrium condition is reestablished in said specimen; and recording on a time basis the varying temperature of the rear surface of said specimen during said period of transient heat flow to produce a temperature-versus-time history of the rear surface of said specimen during said transient heat flow period; thermal diffusivity being determinable from the curve depicting said temperature-versus-time history of the rear surface of said specimen by virtue of the equation $$\alpha = \frac{1.38 L^2}{\pi^2 t_{1/2}}$$

wherein $\alpha$ is the thermal diffusivity in square centimeters per second, L is the thickness of the specimen, measured from front to rear surfaces, in centimeters, $\pi$ is 3.14 and $t_{1/2}$ is the time in seconds for the rear surface of said specimen to reach one-half its maximum temperature rise above ambient temperature as reflected in said temperature-time curve.

7. A method for determining the thermal properties of thermal diffusivity heat capacity and thermal conductivity of materials comprising performance of the following steps on a given material specimen having front and rear surfaces and side edges: uniformly irradiating the front surface of said specimen with a high-intensity, short-duration pulse of thermal energy whose time-duration is short compared with the time required for heat to flow through said specimen from its front to its rear surface while at the same time substantially maintaining the rear surface and side edges of said specimen in thermal insulation and shielded from said irradiating thermal pulse, the irradiation absorbed by the front surface of said specimen in response to said thermal pulse giving rise to a temperature gradient between the front and rear surfaces of said specimen; detecting the temperature of the rear surface of said specimen throughout the period of transient heat flow initiated by said pulse-established temperature gradient until steady state equilibrium condition is reestablished in said specimen; and recording on a time basis the varying temperature of the rear surface of said specimen during said period of transient heat flow to produce a temperature-versus-time history of the rear surface of said specimen during said transient heat flow period; thermal diffusivity being determinable from the curve depicting said temperature-versus-time history of the rear surface of said specimen by virtue of the equation $$\alpha = \frac{1.38 L^2}{\pi^2 t_{1/2}}$$

where $\alpha$ is the thermal diffusivity in square centimeters per second, L is the thickness of the specimen, measured from front to rear surfaces, in centimeters, $\pi$ is 3.14 and $t_{1/2}$ is the time in seconds for the rear surface of said specimen to reach one-half its maximum temperature rise above ambient temperature as reflected in said temperature-time curve; heat capacity being determinable from said curve depicting said temperature-versus-time history of the rear surface of said specimen by virtue of the equation $C = Q/LT_M D$ wherein C is the heat capacity in degrees per calorie per gram for said specimen, Q is the heat energy in calories per square centimeter absorbed per square centimeter by the front surface of said specimen during the irradiation thereof, L is the thickness between front and rear surfaces of said specimen in centimeters, $T_M$ is the maximum temperature above ambient temperature in degrees centigrade at the rear surface of said specimen as reflected in said temperature-time curve and D is the density of the material of said specimen in grams per cubic centimeter; thermal conductivity being determinable from said curve depicting said temperature-versus-time history of the rear surface of said specimen by virtue of the equation $$K = \alpha D C$$

wherein K is the thermal conductivity in calories per centimeter per second per degree centigrade, $\alpha$ is the thermal diffusivity in square centimeters per second, D is the density of the material of said specimen in grams per cubic centimeter and C is the heat capacity of said specimen in degrees per calorie per gram.

8. A method for determining the thermal conductivity of materials comprising performance of the following steps on a given material specimen having front and rear surface and side edges: uniformly irradiating the front surface of said specimen with a high-intensity, short-duration light pulse whose duration is a fraction of the time required for heat to flow through said specimen from its front to its rear surface while at the same time substantially maintaining the rear surface and side edges of said specimen in thermal insulation and shielded from said irradiating light pulse, the irradiation absorbed by the front surface of said specimen in response to said light pulse giving rise to a temperature gradient between the front and rear surfaces of said specimen; detecting the temperature of the rear surface of said specimen throughout the period of transient heat flow initiated by said pulse-established temperature gradient until steady state equilibrium condition is reestablished in said specimen; and recording on a time basis the varying temperature of the rear surface of said specimen during said period of transient heat flow to produce a temperature-versus-time history of the rear surface of said specimen during said transient heat flow period; thermal diffusivity being determinable from the curve depicting said temperature-versustime history of the rear surface of said specimen by virtue of the equation $$\alpha = \frac{1.38 L^2}{\pi^2 t_{1/2}}$$

wherein $\alpha$ is the thermal diffusivity in square centimeters per second, L is the thickness of the specimen, measured from front to rear surfaces, in centimeters, $\pi$ is 3.14 and $t_{1/2}$ is the time in seconds for the rear surface of said specimen to reach one-half its maximum temperature rise above ambient temperature as reflected in said temperature-time curve; heat capacity being determinable from said curve depicting said temperature-versus-time history of the rear surface of said specimen by virtue of the equation $C=Q/LT_MD$ wherein C is the heat capacity in degrees per calorie per gram for said specimen, Q is the heat energy in calories per square centimeter absorbed per square centimeter by the front surface of said specimen during the irradiation thereof, L is the thickness between front and rear surface of said specimen in centimeters, $T_M$ is the maximum temperature above ambient temperature in degrees centigrade at the rear surface of said specimen as reflected in said temperature-time curve and D is the density of the material of said specimen in grams per cubic centimeter; thermal conductivity being determinable from said curve depicting said temperature-versus-time history of the rear surface of said specimen by virtue of the equation $K=\alpha DC$ wherein K is the thermal conductivity in calories per centimeter per second per degree centigrade, $\alpha$ is the thermal diffusivity in square centimeters per second, D is the density of the material of said specimen in grams per cubic centimeter and C is the heat capacity of said specimen in degrees per calorie per gram.

9. A method for determining the thermal properties of thermal diffusivity, heat capacity and thermal conductivity of materials at elevated temperatures comprising performance of the following steps on a given material specimen having front and rear surfaces and side edges: heating the given material specimen to the desired temperature level above ambient room temperature, said elevated temperature level hereinafter referred to as the initial temperature of said specimen; irradiating the front surface of said specimen with a high intensity short duration light pulse whose duration is short compared with the time required for heat to flow through said specimen from its front to its rear surface while at the same time substantially maintaining the rear surface and side edges of said specimen in thermal insulation and also shielded from said irradiating pulse, the radiation absorbed by the front surface of said specimen in response to said light pulse giving rise to a temperature gradient between the front and rear surfaces of said specimen; detecting the temperature of the rear surface of said specimen throughout the period of transient heat flow initiated by said pulse-established temperature gradient until steady state equilibrium condition is reestablished in said specimen; and recording on a time basis the varying temperature of the rear surface of said specimen during said period of transient heat flow to produce a temperature-versus-time history of the rear surface of said specimen during said transient heat flow period; thermal diffusivity being determinable from the curve depicting said temperature-versus-time history of the rear surface of said specimen by virtue of the equation $$\alpha = \frac{1.38 L^2}{\pi^2 t_{1/2}}$$

wherein $\alpha$ is the thermal diffusivity in square centimeters per second, L is said specimen's thickness, measured from front to rear surfaces, in centimeters, $\pi$ is 3.14 and $t_{1/2}$ is the time in seconds for the rear surface of said specimen to reach one-half its maximum temperature rise above said initial temperature as reflected by said temperature-time curve; heat capacity being determinable from said curve depicting said temperature-versus-time history of the rear surface of said specimen by virtue of the equation $C=Q/LT_MD$ wherein C is the heat capacity in degrees per calorie per gram for said specimen, Q is the heat energy in calories per square centimeter, absorbed per square centimeter by the front surface of said specimen during the irradiation thereof, L is the thickness, in centimeters, between front and rear surfaces of said specimen, $T_M$ is the maximum temperature above said initial temperature in degrees centigrade at the rear surface of said specimen as reflected by said temperature-time curve and D is the density of the material of said specimen in grams per cubic centimeter; thermal conductivity being determinable from said curve depicting said temperature-versus-time history of the rear surface of said specimen by virtue of the equation $$K = \alpha DC$$

wherein K is the thermal conductivity in calories per centimeter per second per degree centigrade, $\alpha$ is the thermal diffusivity in square centimeters per second, D is the density of the material of said specimen in grams per cubic centimeter and C is the heat capacity of said specimen in degrees per calorie per gram.

10. A method for determining the thermal properties of thermal diffusivity, heat capacity and thermal conductivity of materials at lowered temperatures comprising performance of the following steps on a given material specimen having front and rear surfaces and side edges: cooling the given material specimen to the desired temperature level below ambient room temperature, said lowered temperature level hereinafter referred to as the initial temperature of said specimen; irradiating the front surface of said specimen with a high intensity short duration light pulse whose duration is short compared with the time required for heat to flow through said specimen from its front to its rear surface while at the same time substantially maintaining the rear surface and side edges of said specimen in thermal insulation and also shielded from said irradiating pulse, the irradiation absorbed by the front surface of said specimen in response to said light pulse giving rise to a temperature gradient between the front and rear surfaces of said specimen; detecting the temperature of the rear surface of said specimen throughout the period of transient heat flow initiated by said pulse-established temperature gradient until steady state equilibrium condition is reestablished in said specimen; and recording on a time basis the varying temperature of the rear surface of said specimen during said period of transient heat flow to produce a temperature-versus-time history of the rear surface of said specimen during said transient heat flow period; thermal diffusivity being determinable from the curve depicting said temperature-versus-time history of the rear surface of said specimen by virtue of the equation $$\alpha = \frac{1.38 L^2}{\pi^2 t_{1/2}}$$

wherein $\alpha$ is the thermal diffusivity in square centimeters per second, L is said specimen's thickness, measured from front to rear surfaces, in centimeters, $\pi$ is 3.14 and $t_{1/2}$ is the time in seconds for the rear surface of said specimen to reach one-half its maximum temperature rise above said initial temperature as reflected by said temperature-time curve; heat capacity being determinable from said curve depicting said temperature-versus-time history of the rear surface of said specimen by virtue of the Equation $C=Q/LT_MD$ wherein C is the heat capacity in degrees per calorie per gram for said specimen, Q is the heat energy in calories per square centimeter, absorbed per square centimeter by the front surface of said specimen during the irradiation thereof, L is the thickness, in centimeters, between front and rear surface of said specimen, $T_M$ is the maximum temperature above said initial temperature in degrees centigrade at the rear surface of said specimen as deflected by said temperature-time curve and D is the density of the material of said specimen in grams per cubic centimeter; thermal conductivity being determinable from said curve depicting said temperature-versus-time history of the rear surface of said specimen by virtue of the equation $K=\alpha DC$ wherein K is the thermal conductivity in calories per centimeter per second per degree centigrade, $\alpha$ is the thermal diffusivity in square centimeters per second, D is the density of the material of said specimen in grams per cubic centimeter and C is the heat capacity of said specimen in degrees per calorie per gram.

11. A method for determining the thermal diffusivity of materials at elevated temperatures comprising performance of the following steps on a given material specimen having front and rear surfaces and side edges: heating the given material specimen to the desired temperature level above ambient room temperature, said elevated temperature level hereinafter referred to as the initial temperature of said specimen; irradiating the front surface of said specimen with a high intensity short duration thermal pulse while at the same time substantially maintaining the rear surface and side edges of said specimen in thermal insulation and also shielded from said irradiating pulse, the radiation absorbed by the front surface of said specimen in response to said thermal pulse giving rise to a temperature gradient between the front and rear surfaces of said specimen; detecting the temperature of the rear surface of said specimen throughout the period of transient heat flow initiated by said pulse-established temperature gradient until steady state equilibrium condition is reestablished in said specimen; and recording on a time basis the varying temperature of the rear surface of said specimen during said period of transient heat flow to produce a temperature-versus-time history of the rear surface of said specimen during said transient heat flow period; thermal diffusivity being determinable from the curve depicting said temperature-versus-time history of the rear surface of said specimen by virtue of the equation $$\alpha = \frac{1.38L^2}{\pi^2 t_{1/2}}$$

wherein $\alpha$ is the thermal diffusivity in square centimeters per second, L is said specimen's thickness, measured from front to rear surfaces, in centimeters, $\pi$ is 3.14 and $t_{1/2}$ is the time in seconds for the rear surface of said specimen to reach one-half its maximum temperature rise above said initial temperature as reflected by said temperature-time curve.

12. A method for determining the heat capacity of materials at elevated temperatures comprising performance of the following steps on a given material specimen having front or rear surfaces and side edges: heating the given material specimen to the desired temperature level above ambient room temperature, said elevated temperature level hereinafter referred to as the initial temperature of said specimen; uniformly irradiating the front surface of said specimen with a high intensity short duration light pulse while at the same time substantially maintaining the rear surface and side edges of said specimen in thermal insulation and also shielded from said irradiating pulse, the radiation absorbed by the front surface of said specimen in response to said light pulse giving rise to a temperature gradient between the front and rear surfaces of said specimen; detecting the temperature of the rear surface of said specimen throughout the period of transient heat flow initiated by said pulse-established temperature gradient until steady state equilibrium condition is reestablished in said specimen; and recording on a time basis the varying temperature of the rear surface of said specimen during said period of transient heat flow to produce a temperature-versus-time history of the rear surface of said specimen during said transient heat flow period; heat capacity being determinable from said curve depicting said temperature-versus-time history of the rear surface of said specimen by virtue of the equation $C=Q/LT_MD$ wherein C is the heat capacity in degrees per calorie per gram for said specimen, Q is the heat energy in calories per square centimeter, absorbed per square centimeter by the front surface of said specimen during the irradiation thereof, L is the thickness, in centimeters, between front and rear surfaces of said specimen, $T_M$ is the maximum temperature above said initial temperature in degrees centigrade at the rear surface of said specimen as reflected by said temperature-time curve and D is the density of the material of said specimen in grams per cubic centimeter.

13. A method for determining the thermal conductivity of materials at elevated temperatures comprising performance of the following steps on a given material specimen having front and rear surface and side edges: heating the given material specimen to the desired temperature level above ambient room temperature, said elevated temperature level hereinafter referred to as the initial temperature of said specimen; uniformly irradiating the front surface of said specimen with a high intensity short duration light pulse whose duration is short compared with the time required for heat to flow through said specimen from its front to its rear surface while at the same time substantially maintaining the rear surface and side edges of said specimen in thermal insulation and also shielded from said irradiating pulse, the radiation absorbed by the front surface of said specimen in response to said light pulse giving rise to a temperature gradient between the front and rear surfaces of said specimen; detecting the temperature of the rear surface of said specimen throughout the period of transient heat flow initiated by said pulse-established temperature gradient until steady state equilibrium condition is reestablished in said specimen; and recording on a time basis the varying temperature of the rear surface of said specimen during said period of transient heat flow to produce a temperature-versus-time history of the rear surface of said specimen during said transient heat flow period; thermal diffusivity being determinable from the curve depicting said temperature-versus-time history of the rear surface of said specimen by virtue of the equation $$\alpha = \frac{1.38L^2}{\pi^2 t_{1/2}}$$

wherein $\alpha$ is the thermal diffusivity in square centimeters per second, L is said specimen's thickness, measured from front to rear surfaces, in centimeters, $\pi$ is 3.14 and $t_{1/2}$ is the time in seconds for the rear surface of said specimen to reach one-half its maximum temperature rise above said initial temperature as reflected by said temperature-time curve; heat capacity being determinable from said curve depicting said temperature-versus-time history of the rear surface of said specimen by virtue of the equation $C=Q/LT_MD$ wherein C is the heat capacity in degrees per calorie per gram for said specimen, Q is the heat energy in calories per square centimeter, absorbed per square centimeter by the front surface of said specimen during the irradiation thereof, L is the thickness, in centimeters, between front and rear surfaces of said specimen, $T_M$ is the maximum temperature above said initial temperature in degrees centigrade at the rear surface of said specimen as reflected by said temperature-time curve and D is the density of the material of said specimen in grams per cubic centimeter; thermal conductivity being determinable from said curve depicting said temperature-versus-time history of the rear surface of said specimen by virtue of the equation wherein K is the thermal conductivity in calories per centimeter per second per degree centigrade, $\alpha$ is the thermal diffusivity in square centimeters per second, D is the density of the material of said specimen in grams per cubic centimeter and C is the heat capacity of said specimen in degrees per calorie per gram, said equation being $K=\alpha DC$.

14. Apparatus for determining the thermal properties of thermal diffusivity, heat capacity and thermal conductivity of materials comprising: means for producing a high-intensity short-duration light pulse; specimen-holding means mounted in juxtaposition to said light pulse producing means both for holding a given material specimen for uniform irradiation of its front surface by the light pulse produced by said light pulse producing means, and for keeping the balance of said specimen in thermal insulation and shielded from the radiation emitted by the light pulse of said light pulse producing means; and temperature sensing-and-recording means, positioned to the rear of said specimen-holding means, for sensing the temperature of the rear surface of said specimen during the period of transient heat flow through said specimen from its front to rear surface due to the temperature gradient therebetween because of the radiation received by said specimen's front surface from the light pulse produced by said light pulse producing means, and for recording on a time basis during said period of transient heat flow the temperature variation of the rear surface of said specimen, thereby enabling formation of a temperature-time history, during said period of transient heat flow, of the rear surface of said specimen, the thermal diffusivity, heat capacity and thermal conductivity of said specimen being derivative from the temperature-time history obtained for the rear surface of said specimen during said period of transient heat flow.

15. The apparatus of claim 14 wherein said light producing means produces a light pulse whose duration is short compared with the time required for heat to flow through said specimen from its front to its rear surface.

16. The apparatus of claim 14 wherein said specimen-holding means is selectively positionable with respect to said light pulse producing means to enable operator-selection of the distance between the front surface of said specimen operatively supported by said specimen-holding means and said light pulse producing means whose pulse irradiates said specimen's front surface.

References Cited by the Examiner
UNITED STATES PATENTS

| | | |
|---|---|---|
| 1,307,528 | 6/19 | Wells. |
| 3,008,029 | 11/61 | Davis et al. |
| 3,069,893 | 12/62 | Kerstetter _____ 73—15 |

RICHARD C. QUEISSER, *Primary Examiner.*

DAVID SCHONBERG, *Examiner.*